Sept. 4, 1945.    S. SCHNELL    2,384,346
INDUSTRIAL BRAKE
Filed June 23, 1943    3 Sheets-Sheet 3
FIG. 4.
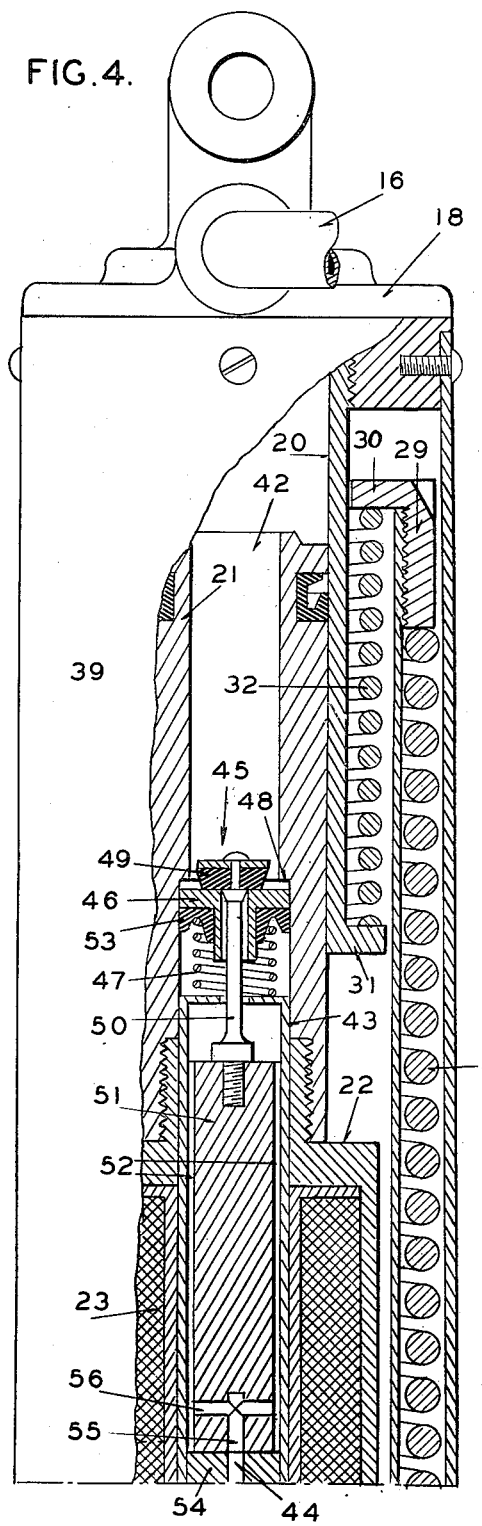
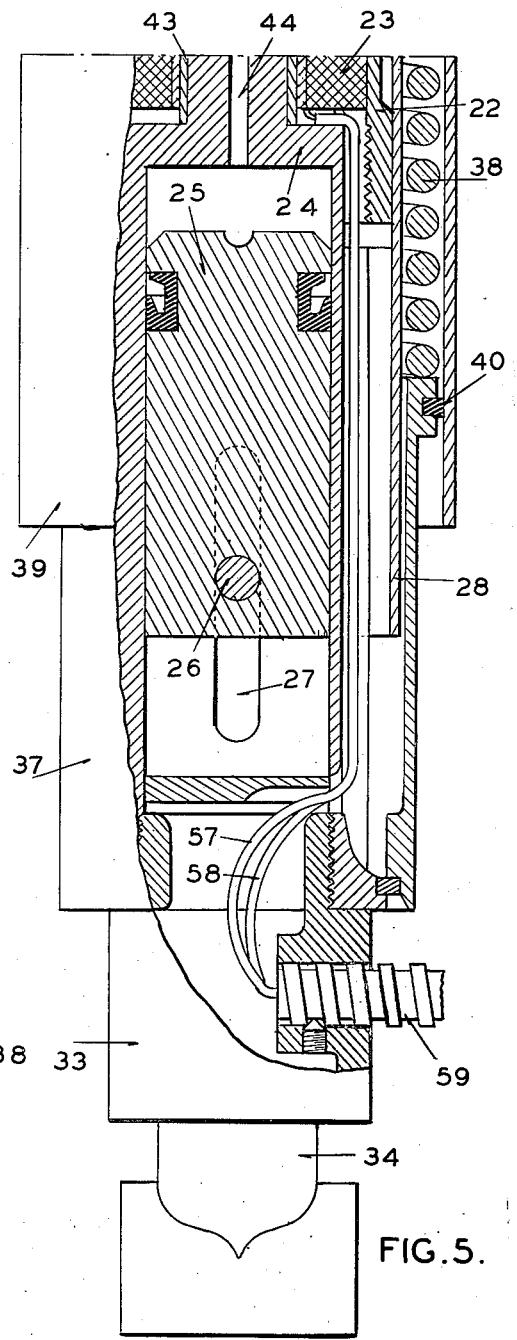
FIG. 5.
INVENTOR
S. SCHNELL
BY
ATTORNEY Patented Sept. 4, 1945

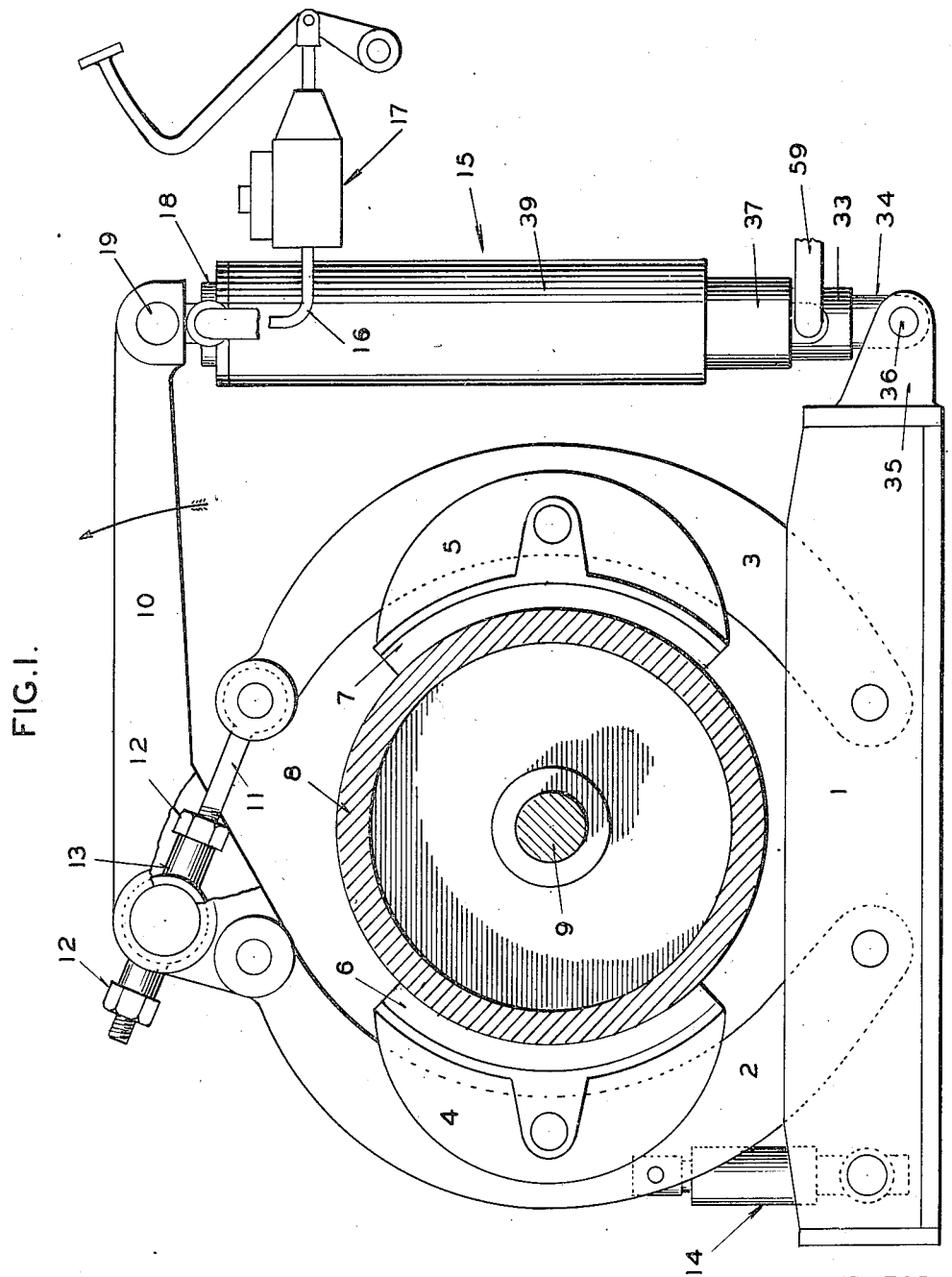

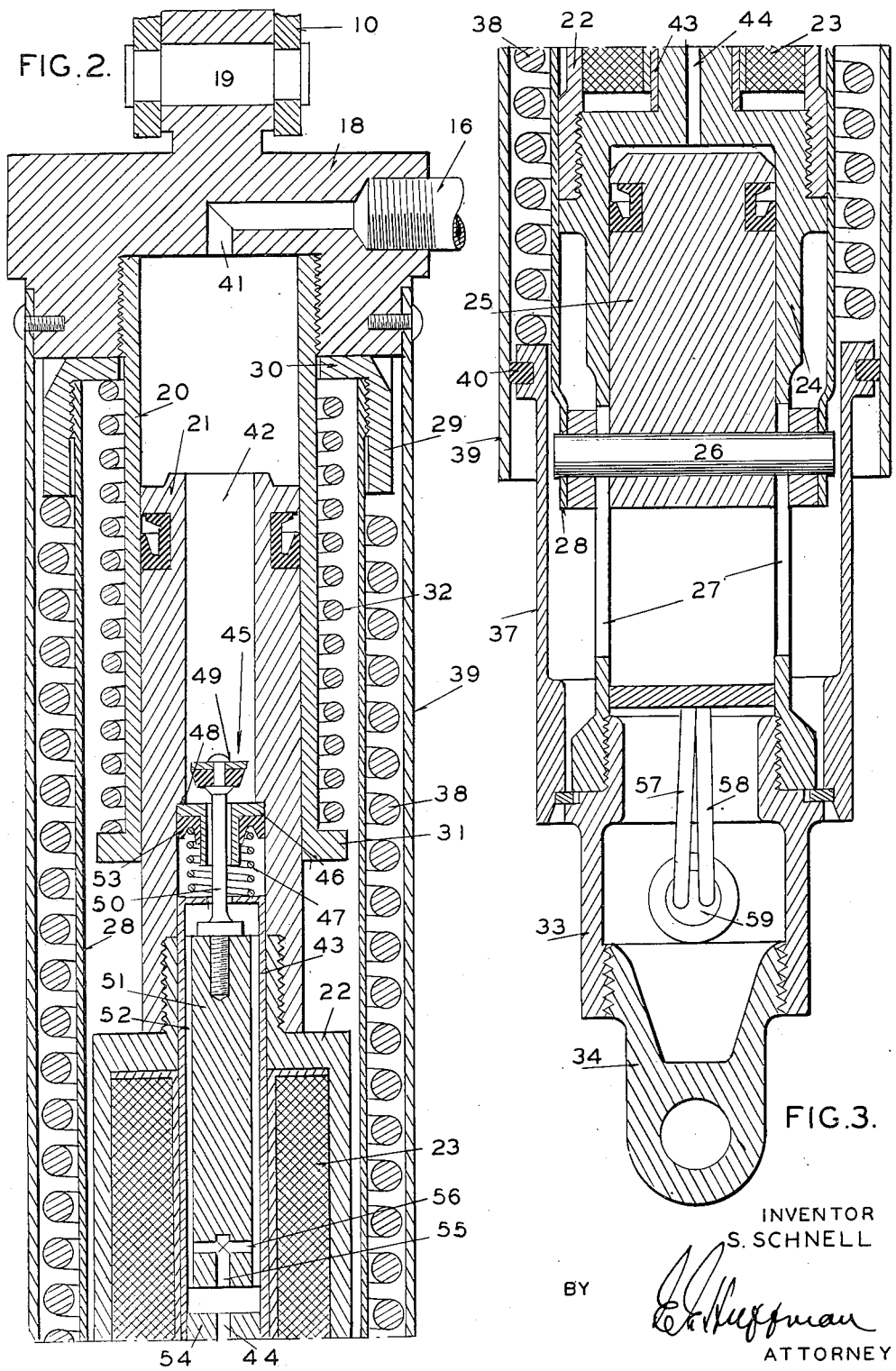

2,384,346

UNITED STATES PATENT OFFICE 2,384,346

INDUSTRIAL BRAKE

Steve Schnell, Kirkwood, Mo., assignor to Wagner Electric Corporation, St. Louis, Mo., a corporation of Delaware Application June 23, 1943, Serial No. 491,915

20 Claims. (Cl. 188—151)

My invention relates to brakes and more particularly to improved means for controlling the application and release of industrial brakes.

One of the objects of my invention is to produce an improved brake assembly which can be held applied by spring pressure under certain conditions and under other conditions can be applied and released by the application and release of fluid pressure without interference by the spring pressure.

Another object of my invention is to provide fluid pressure control means for a spring-applied brake which can be employed to nullify the applying force of the spring and to then permit application and release of the brake solely by application and release of fluid pressure.

Still another object of my invention is to provide improved control means for an industrial brake which will permit the brake to be held applied by a spring whenever electrical current is not available for operating the mechanism with which the brake is associated and to permit release of the spring force and subsequent application and release of the brake at will by application and release of fluid pressure when current is being supplied and without the necessity of compressing the spring during each release of the brake.

Other objects of my invention will become apparent from the following description taken in connection with the accompanying drawings in which Figure 1 is a view of a brake assembly embodying my invention in the control means therefor; Figures 2 and 3 are sectional views of the upper and lower parts of the control means; and Figures 4 and 5 are views similar to Figures 2 and 3 but with the sectional portions thereof taken at right angles to those of Figures 2 and 3, said Figures 4 and 5 showing the parts in positions corresponding to the solenoid being energized and fluid pressure being applied.

Referring to the drawings in detail and first to Figure 1, numeral 1 indicates a base upon which two levers 2 and 3 carrying brake shoes 4 and 5, respectively, are pivoted. These brake shoes are provided with linings 6 and 7 for cooperation with a drum 8 rotatable with a shaft 9 forming a part of any industrial mechanism, such as a crane, winch, or the like, said shaft being driven by a source of power, such as an electric motor. The upper end of lever 2 has pivoted thereon a long L-shaped lever 10 extending across the top of the brake assembly. An intermediate point of this lever is connected to the upper end of lever 3 by means of a link 11. The link 11 and lever 10 may be adjusted by a suitable mechanism shown as nuts 12 threaded upon link 11 and cooperating with a member 13 forming part of the pivotal connection between link 11 and lever 10.

When lever 10 is moved in the direction indicated by the arrow, the levers 2 and 3 will be moved toward each other and the brake shoes applied. When lever 10 is moved in the opposite direction, the brake shoes will be released. In order to prevent the shoes from dragging on the drum when the brake is released, there is provided an adjusting mechanism 14 interposed between lever 2 and the base. This adjusting mechanism forms no part of my invention and, therefore, is not shown in detail. It is believed to be sufficient to state that it is automatically operable to maintain a predetermined distance or clearance between the lining of the brake shoe 4 and the lining of the drum when the brake is in released condition. As the brake shoe lining wears, adjustment will take place.

In accordance with my invention, I provide improved means for controlling lever 10 to apply and release the brake shoes, this mechanism being generally indicated by the numeral 15 is shown in detail in Figures 2 to 5. The control device is fluid pressure operated and a conduit 16 leads to any source of pressure such as, for example, a foot-operated master cylinder device 17.

Referring now to Figures 2 to 5, the control means has an upper cap member 18 pivotally mounted on the outer end of lever 10 by a pin 19. Threaded into this cap member is a cylinder 20 in which is mounted a piston 21. The lower end of this piston has secured thereto a shell 22 for housing a solenoid 23 and secured to the lower end of this shell member is a second cylinder 24 in which is mounted a piston 25. Piston 25 carries a pin 26 which projects through slots 27 on opposite sides of the cylinder 24 to connect the piston to the lower end of a cylindrical member 28 which surrounds cylinder 24, shell 22, and cylinder 21 and has its upper end positioned adjacent cap 18. To this upper end is secured a ring member 29 having an internal flange 30 and interposed between said flange and a ring 31 carried by the lower end of cylinder 20 is a coil spring 32 surrounding cylinder 20.

The lower end of cylinder 24 is adapted to be pivotally connected to base 1, this structure comprising a hollow member 33 threaded in the lower end of the cylinder and a connecting member 34 pivoted to ears 35 on the base by means of a pin 36. The member 33 also has secured thereto an upwardly extending cylindrical member 37 which surrounds the lower end of cylinder 24. Interposed between this cylindrical member 37 and the previously referred to ring 29 carried by the upper end of the cylindrical member 28 is a strong coil spring 38, said spring surrounding the cylindrical member 28. This strong spring acts to move the cylindrical member 28 away from the base member and engage the ring 29 on the upper end of said cylindrical member with cap 18 and thus apply a strong force to the outer end of lever 10 to apply the brake shoes by moving lever 10 in the direction of the arrow. In order to protect the spring 38 from dirt, water, ice, and other undesirable substances, cap 18 carries a shell 39 which surrounds the entire length of the spring. The lower end of this shell has a sliding fit with the upper end of the cylindrical member 37 which carries a sealing gasket 40 over which the shell slides.

The previously referred to conduit 16 which connects with the master cylinder device 17 is connected to cap 18 and a passage 41 in this cap places the conduit in communication with the upper end of cylinder 20. The piston 21 in cylinder 20 is provided with a central passage 42 which connects with a tube 43 around which the coils of the solenoid are positioned. The lower end of this tube is in communication with a passage 44 which leads to the upper end of cylinder 24. Thus it is seen that cylinder 20 ahead of piston 21 and cylinder 24 ahead of piston 25 are both capable of being connected to the master cylinder.

The passage 42 through piston 21 is adapted to be controlled by a valve generally referred to by the numeral 45, which valve is controllable by the solenoid so as to be held closed when the solenoid is energized and capable of opening when the solenoid is de-energized. The valve comprises a seat 46 positioned in passage 42 and biased by a spring 47 to abut a shoulder 48 in the passage. Cooperating with the valve seat is a movable valve element 49 mounted on a stem 50 extending through the valve seat and connected to a plunger 51 positioned in tube 43 and forming the movable element of the solenoid. The plunger is provided with longitudinal grooves 52 in the surface in order to permit fluid to flow past it to passage 44 in cylinder 24.

The solenoid, when energized, will hold plunger 51 downwardly and cause the valve element 49 to forcibly engage seat 46. When the solenoid is de-energized, fluid may flow past the valve element by merely pushing it off the seat and thus return from the lower cylinder 24 to the upper cylinder 20 and the master cylinder device. When the valve element 49 is seated, fluid will be trapped in cylinder 24 and cannot return to cylinder 20 and the master cylinder device. In order to seal seat 46 to prevent any passage of fluid past it from cylinder 24 to cylinder 20 when valve element 49 is seated, said seat has associated therewith a cup 53 which is interposed between spring 47 and valve seat 46. Since the seat 46 is capable of movement in the passage in a direction away from shoulder 48, fluid pressure can flow past the valve from cylinder 20 to cylinder 24 at any time since, when the fluid pressure is great enough to move the valve seat 46 downwardly against the bias of spring 47 and away from valve element 49, fluid can pass the valve. It is thus seen that the valve 45 in the passage acts as a check valve when closed, permitting fluid to flow to cylinder 24 but not in the opposite direction.

When the check valve is open, the fluid can flow freely to the valve in both directions. When the valve element 49 is seated by the energization of the solenoid, plunger 51 will abut against an extension 54 carried by cylinder 24, which extension projects into the lower end of tube 43 and is provided with the passage 44. The abutment of the plunger against extension 54, however, does not take place until after the valve element 49 is seated. Due to the yieldable arrangement of valve seat 46, plunger 51 will always be permitted to engage extension 54 and thus close the air gap so that the solenoid will have its maximum pull when valve 49 is in seated condition. In order to permit fluid to flow through passage 44 when the plunger is seated against extension 54, the lower end of the plunger is provided with a central drilled passage 55 and a cross drilled passage 56.

The coils forming the solenoid have their ends connected to conductors 57 and 58 which extend downwardly along side cylinder 24 into the hollow member 33 where they enter a cable 59. The conductors 57 and 58 are connected in a main circuit forming part of the circuit for operating a motor associated with the crane or like apparatus with which the brake is associated. Whenever this main circuit is broken, the circuit of the solenoid is also broken and whenever the main circuit is closed, the solenoid circuit will be closed, thus energizing the solenoid.

Referring to the operation of the brake assembly, the parts of the control mechanism for the brakes will be in the positions shown in Figures 1, 2, and 3 when the circuit with which the solenoid is associated is opened and no fluid pressure is being developed by the master cylinder device. Under these conditions the strong spring 38 will maintain the brake applied since it is free to apply its force through cap 18 to lever 10 to turn it in the direction of the arrow. The valve 45 will be open since the solenoid is not energized. When it is desired to operate the apparatus, such as a crane, the main circuit will be closed, thus also closing the circuit to the solenoid and energizing said solenoid. When the solenoid is energized, it will pull the plunger 51 downwardly and hold the valve element 49 seated as seen in Figure 4.

Actuation of the master cylinder device will now cause fluid pressure to be developed and forced into cylinder 20 and also into cylinder 24 since fluid can flow past the closed valve 45 as already explained. In entering the cylinder 24, the fluid will act on piston 25 and force this piston downwardly, carrying with it pin 26 and cylindrical member 28, thereby compressing the strong spring 38 and relieving the pressure thereof on lever 10. Figures 4 and 5 show the spring 38 partially compressed by a downward movement of piston 25. When the brake is to be fully released, piston 25 will be at the lower end of its cylinder with pin 26 at the lower end of slot 27. However, the release of the spring force or nullification of its action will not cause rotation of lever 10 to release the brakes for as the fluid pressure increases to compress the spring there will be set up a reaction of the fluid pressure on cap 18, thus maintaining the brakes applied. After full compression of the spring it will remain compressed due to the fact that the fluid under pressure which has been forced into cylinder 24 and acting on piston 25 will be trapped due to the closed condition of valve 45.

The downward movement of the cylindrical member 28 to compress the strong spring 38 will also cause a compression of the lighter spring 32 and thus cause the force of this lighter spring to tend to release the brakes. However, the brakes will not be released due to the referred to reaction of fluid pressure through cap 18 and on lever 10.

With the action of the strong spring 38 now nullified, the brakes may be released by merely releasing the fluid pressure developed by the master cylinder device. This release of fluid pressure will permit spring 32 to act through cylinder 20 and the cap to cause a release of the brake shoes by moving lever 10 in the direction opposite that indicated by the arrow. Since valve 45 will remain closed due to the energized condition of the solenoid, the force of the strong spring will remain nullified. If it is again desired to apply the brakes at any time, this can be done at will by merely actuating the master cylinder device which will again develop pressure in cylinder 20 and force cap 18 upwardly to rotate lever 10 in the direction of the arrow. Release of the brake can again be accomplished by merely releasing the pressure of the master cylinder device.

It is thus seen that when the solenoid is de-energized the strong spring 38 will hold the brakes applied. Energization of the solenoid and actuation of the master cylinder device will result in the force of the strong spring 38 being nullified and the placing of the control of the brake solely under the fluid pressure developed by the master cylinder device. Thus after nullifying the spring, the brake can be applied and released at will in the same manner as though spring 38 were not present. In other words, the brake is controlled in the same manner as an ordinary fluid actuated applied and released brake.

If the master cylinder device should be actuated prior to the energization of the solenoid, the brakes, nevertheless, will remain applied as already indicated since the fluid pressure developed by the master cylinder device merely compresses the strong spring 38. With fluid pressure developed prior to the energization of the solenoid, a subsequent energization of the solenoid will result in the valve 45 being closed and fluid under pressure trapped in cylinder 24. This will then nullify the action of the spring and a release of the master cylinder developed fluid pressure will result in a release of the brakes. If the solenoid is not energized while fluid pressure is developed by the master cylinder device, then release thereof will not have any effect in releasing the brakes as this developed fluid pressure will only compress the spring and then permit it to expand again as the fluid pressure developed by the master cylinder device is released.

If the circuit of the solenoid should be broken at any time when the master cylinder device is not being actuated, the brake will be automatically applied under the action of strong spring 38. When the solenoid is de-energized, valve 45 will be free to open and fluid pressure which has been trapped in the cylinder 24 can then pass out to the master cylinder device. This will release the strong spring 38 and allow it to become effective to act through cap 18 and lever 10 to apply the brakes.

From the foregoing description it is apparent that my improved control means for a brake has many advantages. If the circuit to which the solenoid is connected is opened, the brakes will be maintained in applied condition by a strong spring regardless of whether or not the operator should actuate the master cylinder device. When the master cylinder device is once actuated and then released and there is no release of the brakes, the operator will immediately have knowledge that something is wrong with the main circuit and he will know that it must be closed before he can operate the crane or winch with which the brake is associated. During all this time, however, the brake is applied and there is no danger of accidental movement of the shaft controlled by the brake. By means of this structure it is impossible for the operator to leave the crane or winch with the brakes released whenever he cuts the main circuit. As soon as the operator breaks the main circuit, the solenoid will be de-energized and the brakes automatically applied under the action of the strong spring 38 and maintained applied until the circuit is again closed and the operator actuates the master cylinder device. When the brake applying force of the strong spring is nullified, the operation of the brakes is entirely at the will of the operator by the actuation and release of the master cylinder device and it is not necessary for him to compress the strong spring each time he desires to release the brakes. Once this spring has been compressed by fluid pressure, it will be maintained compressed by trapped fluid if the solenoid is energized. He can then control the braking action by merely actuating the master cylinder sufficiently to give the desired braking pressure.

It is to be noted in the particular construction shown that the weaker spring 32 does not in any way affect the force of the large spring 38 in holding the brakes applied since it will act between two non-relatively movable abutments whenever ring 29 on the end of the cylindrical member 28 engages cap 18. It is to be further noted in the construction shown that the brake will always be held applied with the same pressure as exerted by the strong spring during the compressing of this spring 38 by fluid pressure. Thus if the strong spring is capable of exerting a force of 250 pounds and a force of 50 pounds only results from fluid pressure developed by the master cylinder device, this 50 pound pressure will cause the spring force to be decreased 50 pounds but since the reaction of the fluid pressure on the cap will be 50 pounds, the total force still acting to hold the brakes applied is 250 pounds as previously exerted solely by the strong spring 38. The brake can never be totally released until the force of the strong spring has been removed from cap 18, the solenoid energized, and developed fluid pressure released.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a member to be actuated, spring means for biasing the member to an operative position, fluid pressure operated means for relieving the force of the spring means from the member and for simultaneously maintaining the member in its operative position, a source of fluid pressure for operating the fluid pressure means, and means comprising valve means for trapping fluid pressure to hold the spring means in the force relieved condition and permitting the member to assume an inoperative position when fluid pressure from the source is released.

2. In apparatus of the class described, a member to be actuated, spring means for biasing the member to an operative position, fluid pressure operated means for relieving the force of the spring means from the member, means for applying fluid pressure to the member, a source of fluid pressure connected to the fluid pressure operated means and the last named means for simultaneously operating them by fluid pressure when transmitted thereto from the source, and valve means for trapping fluid pressure in the fluid pressure operated means to hold the spring means in released condition and permitting the member to assume an inoperative position when the fluid pressure from the source is released.

3. In apparatus of the class described, a member to be actuated, spring means for biasing the member to an operative position, a fluid motor, a second fluid motor connected to apply a force to the member, a source of fluid pressure connected to the fluid motors for simultaneously operating them by fluid pressure, and valve means for trapping fluid pressure in the first fluid motor to thereby permit the member to assume an inoperative position when the fluid pressure from the source is no longer effective in the second fluid motor.

4. In apparatus of the class described, a member to be actuated, a fluid motor for controlling said member, a spring acting on said member to position it in an operative position, a second fluid motor for compressing the spring and preventing it from acting on the member, a source of fluid pressure communicating with both motors, valve means for trapping fluid under pressure in the second motor and permitting the member to be controlled by the first fluid motor, and electrical means comprising a solenoid for holding said valve means closed.

5. In apparatus of the class described, a member to be actuated, a cylinder connected to the member, a piston in the cylinder, a second cylinder connected to the piston and an abutment, conduit means for placing the cylinders in communication with each other, a piston in the second cylinder, a spring acting on the member to bias it to an operative position, a connection between the second piston and spring for compressing the spring and relieving its force from the member, a source of fluid pressure communicating with the first cylinder and through the conduit means with the second cylinder, and valve means associated with the conduit means for trapping fluid under pressure in the second cylinder.

6. In braking apparatus, a brake, a support, a movable member for applying the brake, a cylinder connected to the member, a piston in the cylinder, a second cylinder connected to the piston and the support, conduit means for placing the cylinders in communication with each other, a piston in the second cylinder, a spring acting on the member to bias it to an operative position, a connection between the second piston and spring for compressing the spring and relieving its force from the member, a source of fluid pressure communicating with the first cylinder and through the conduit means with the second cylinder, valve means associated with the conduit means for trapping fluid under pressure in the second cylinder, and electrical means comprising a solenoid for controlling the valve means.

7. In braking apparatus, a brake, a support, a movable member for applying the brake, a cylinder connected to the member, a piston in the cylinder, a second cylinder connected to the support, a connecting member between the piston and second cylinder, said piston and member being provided with a passage for placing the first cylinder in communication with the second cylinder, valve means in said passage, electrical means comprising a solenoid carried by the connecting means for controlling the valve, a piston in the second cylinder, a coil spring acting on the member to apply the brake, a connection between the second piston and the spring for compressing the spring by movement of the piston and thereby relieve its force from the member, and a source of pressure connected to the first cylinder.

8. In braking apparatus, a brake, a support, a movable member for applying the brake, a cylinder connected to the member, a piston in the cylinder, a second cylinder connected with the piston and the support, a piston in the second cylinder, a compressed coil spring surrounding the cylinder and operatively connected at one end to apply pressure to the member, connecting means between said one end and the piston in the second cylinder to compress the spring and relieve its force from the member without moving the member when the piston in the second cylinder is actuated, a source of fluid pressure, conduit means for placing the source in communication with both cylinders, and valve means for trapping fluid under pressure in the second cylinder only.

9. In apparatus of the class described, a member to be actuated, spring means for biasing the member to one operative position, an abutment, a fluid motor interposed between the abutment and the member, a second fluid motor connected to the spring to compress it and relieve its force from the member, a second spring, means operable by the compressing of the first spring for causing the second spring to apply a force tending to move the member to an inoperative position, a source of pressure connected to both fluid motors, and valve means for trapping fluid pressure in the second motor to hold the first spring in compressed condition.

10. In brake control apparatus, a spring for holding the brake applied, means for relieving the force of the spring from applying the brake, means for holding the spring in its force relieved condition, electrical means including a circuit and a solenoid for operating said holding means, and means for controlling the application and release of the brake at will when the force of the spring is relieved.

11. In a brake control apparatus, a member for applying the brake, a spring for biasing the member to a brake applied position, a fluid motor for compressing the spring and relieving its force from the member, a fluid motor for applying pressure to the member to apply the brakes, a source of fluid pressure connected to both fluid motors, and means for holding the spring in compressed condition after being compressed by operation of the first fluid motor.

12. In a brake control apparatus, a member for applying the brake, a spring for biasing the member to brake applied position, a fluid motor for compressing the spring and relieving its force from the member, a fluid motor for applying pressure to the member to apply the brake, a source of fluid pressure connected to both fluid motors, means for holding the spring in compressed condition after being compressed by operation of the first fluid motor, a solenoid for operating the holding means, and an electrical circuit for energizing the solenoid.

13. In apparatus of the class described, a rotatable element, a brake engageable with said element, spring means for biasing said brake into engagement with said element, means for relieving the force of said spring from said brake, valve means for holding said spring in relieved condition, means for operating said valve, and a pressure fluid motor manually operated for controlling said brake when the spring is in relieved condition.

14. In apparatus of the class described, a rotatable element, a brake to be applied to and disengaged from said element, spring means to bias said brake into engagement with said element, a source of pressure fluid, a pressure fluid operated motor operable by pressure fluid from said source for relieving the force of said spring from said brake, valve means in said motor to hold said spring in relieved condition, means to control said valve and other means pressure fluid operated supplied from said source manually controlled for operating said brake to apply and disengage same from said element when the force of the spring is relieved.

15. In apparatus of the class described, a rotatable member, a brake for said member, spring means to bias said brake into engagement with said rotatable member, pressure fluid operated means for relieving the force of said spring from said brake, valve means for maintaining the spring in relieved condition, means to operate said valve, and pressure fluid operated means for manually controlling the application of said brake to said rotatable member when said spring is maintained in relieved condition.

16. In apparatus of the class described, a rotatable member, a brake to be applied to said member, spring means for biasing said brake into engagement with said member, pressure fluid operated means for relieving the force of the spring from said brake and for operating said brake when said spring is in its relieved position, and means for maintaining the spring in its relieved condition and permitting said brake to assume an inoperative position by the release of pressure fluid from said pressure fluid actuated means.

17. In apparatus of the class described, a rotatable element, a brake to be applied to said element, spring means for biasing said brake to operative position, pressure fluid operated means for relieving the force of said spring from said brake and for simultaneously maintaining the brake in its operative position, a source of pressure fluid for operating said pressure fluid means, and means for holding said spring in its force relieved condition and permitting said brake to assume an inoperative position when the pressure fluid from said source is released.

18. In apparatus of the class described, a rotatable element, a brake to be applied to said element, spring means for biasing said brake to an operative position, means for relieving the force of said spring from said brake, means for holding said spring in a force relieved condition, a second spring, means for causing said second spring to bias said brake to an inoperative position when the force of said first spring is relieved, and pressure fluid operated means manually controlled for moving said member into operative engagement with said rotatable element.

19. In apparatus of the class described, a driven element, a brake to be applied to said element, spring means normally biasing said brake into engagement with said element, a first means, pressure fluid operated, for relieving the force of said spring on said brake, a second means for holding said spring in a condition where its force is relieved, a third means, manually operated, for controlling said brake after said spring is relieved, and means to operate said second means when the power supply to said driven element is interrupted.

20. In apparatus of the class described, a rotatable element, a brake comprising a pair of shoes to be applied to said element, spring means for biasing said shoes into engagement with said element, means to compress said spring and hold it compressed to relieve its force from said shoes, other means to control the operation of said brake, and manually operable means to control said brake shoes to engage them with said element when the force of said spring is relieved from said shoes.

STEVE SCHNELL.